Patented Apr. 2, 1929.

1,707,940

UNITED STATES PATENT OFFICE.

HOWARD W. MATHESON, OF MONTREAL, QUEBEC, CANADA, AND JULIUS A. NIEUWLAND, OF NOTRE DAME, INDIANA, ASSIGNORS TO CANADIAN ELECTRO PRODUCTS COMPANY, LIMITED, OF MONTREAL, QUEBEC, CANADA.

PHENOL-ACETYLENE RESIN.

No Drawing. Application filed May 13, 1922. Serial No. 560,713.

This invention has relation to a process of manufacture and to a composition of matter and has particular reference to the manufacture of resinous bodies, especially adapted on further treatment to conversion into infusible and insoluble bodies in any desired form; furthermore, the material itself, dissolved in suitable solvents, is adapted for various uses for which synthetic resinous bodies are utilized.

It is well known that synthetic resins may be formed by the action of phenol or its homologues on formaldehyde or its polymers, either with or without the presence of a catalyst. This initial compound subjected to the action of heat and pressure in the presence of accelerating or hardening agents gives an infusible and insoluble resin.

According to this invention, a very superior phenolic condensation product, possessing many points of advantage over known phenol resins, may be made by treating a phenolic body with a body containing the triple bond characteristic of acetylene, and its homologues, expressed —C≡C—, preferably in presence of a catalyst. The resulting product is ordinarily a semi-plastic or a solid body at ordinary temperatures and is fusible, and soluble in ordinary solvents such as alcohol and acetone, and is capable of being converted into an infusible and insoluble body. Methods which may be utilized for this transformation are outlined in co-pending application, Serial Number 539,296 filed Feb. 25, 1922, by Matheson and Skirrow.

In carrying out the invention, the catalyst, preferably a salt or oxide of mercury preferably admixed with a suitable amount of an acid or acid salt is added to the phenol, and the acetylene is then passed into the mixture, or in the case of a liquid acetylene the catalyst may if desired be added to previously mixed phenol and acetylene or to the acetylene. Suitable temperature control is maintained. When working with ordinary acetylene, $C_2H_2$, the gas is preferably passed through the phenolic body considerably in excess of the amount that can be absorbed, and the excess or uncombined acetylene may be withdrawn from the reaction and then returned by means of a pump or other apparatus. The employment of an excess of acetylene is important, although not essential to the success of the process, and serves several useful purposes, to wit;—first, the excess of acetylene, utilizing a suitably shaped vessel, serves to keep the catalyst in suspension in the reaction mixture; second, the escaping acetylene removes part of the heat of reaction and the gas can be readily cooled before return to the reaction; and third, the presence of an excess of acetylene increases the rate of reaction.

The reaction medium should preferably be anhydrous and the acetylene should have been previously dried. The use of anhydrous materials is not absolutely essential, although highly desirable. The reaction is preferably carried out at atmospheric pressure but may be carried out above or below the atmospheric pressure, or the pressure may be varied during the continuance of the reaction. When using ordinary acetylene, the temperature of the reaction is preferably maintained between 50° and 150° C. although a greater range of temperature is permissible and to some extent practicable.

The reaction may also be conducted by the use of a solvent for the phenolic body and, for this purpose, there may be used glacial acetic acid, an alcohol (not necessarily monohydric), acetone or any other liquid in which the phenolic body is soluble and which has no detrimental effect on the reaction or the reaction product.

The following examples dealing with the use of ordinary acetylene will serve to illustrate the application of the invention, but it must be understood that the invention is not thereby limited to this particular member of the acetylene group or to the proportions, temperatures, catalytic agents, etc. therein mentioned.

Example I.

Two and one-half (2.5) parts of mercurous sulphate and one (1.0) part of sulphuric acid are mixed with one hundred (100) parts of phenol ($C_6H_5OH$). Dry acetylene gas ($C_2H_2$) in excess of the combinable amount is passed into the mixture and the temperature maintained between 90°–115° C. The gas is absorbed readily, the period of reaction being from one to two hours, and a considerable amount of heat being given off. Cooling may be required during the early part of the reaction and warming during the latter part. Approximately fourteen (14.0) parts of acetylene are absorbed and the material formed in the reaction vessel is a heavy liquid which on cooling becomes solid or semi-solid. The material may be now treated for separation of mercury compounds, either by settling, centrifuging, filtration or other suitable means, the material being preferably kept molten during the period of separation. This step, however, is not essential except when the finished product is intended for purposes requiring high dielectric strength. Sulphuric anhydride may be used instead of sulphuric acid.

*Example II.*

Same as Example I except that four (4) parts of mercurous sulphate and two (2) parts of sulphuric acid are mixed with one hundred (100) parts of phenol.

*Example III.*

Same as Example I except that fifty (50) parts of glacial acetic acid are added as a solvent for the phenol and the resultant product. During the reaction period the vessel is connected to a reflux condenser, which condenses the acetic acid entrained by escaping acetylene and returns same to the reaction vessel. The reaction material may then be suitably treated for the removal of acetic acid and any volatile products that may be formed by the action of acetylene on the acetic acid. This may be conveniently done by heating the reaction product to approximately 120° C. and maintaining the circulation of acetylene after the main reaction is completed and condensing the entrained acetic acid by the use of a suitable condenser, arranged so that the condensate is discharged into a separate receiver and thus removed from the reaction vessel.

*Example IV.*

Same as Example I, except that cresylic acid is added in place of phenol. Similar results are obtained.

*Example V.*

The same proportions are utilized as outlined in Example I, and after the main reaction is completed at a temperature of 90°–115° C., the temperature of the reaction vessel is then raised to about 140°–150° C. by any suitable method of heating. The circulation of the acetylene gas is maintained and the same is passed through a condenser arranged so that any material driven off from the reaction vessel and condensed does not return to the reaction vessel. By maintaining the circulation of acetylene for a suitable length of time, all or practically all the unconverted phenol is removed from the reaction product and this removed phenol may vary in amount from 10% to 30% of the original phenol used. Any other suitable gas may be used to sweep out the phenol or the same may be washed out or neutralized and allowed to remain or removed after neutralization. The resultant product is a soluble, fusible, friable solid when cooled to ordinary temperature. The removal of the mercury from this product is best conducted by dissolving in a suitable solvent, such as alcohol, and subjecting the same to the action of centrifugal force. The mercury may also be removed before distilling off the phenol by the use of a centrifuge, the material being kept molten, say at 80° C. or over, during the operation.

In order to convert an acetylene-phenolic condensation product manufactured as outlined in the examples cited or otherwise into an infusible and insoluble product, the product may be combined with an aldehydic body as outlined in co-pending application, Serial Number 539,296 or otherwise. It is found, however, that the material—more particularly the product of Example V—may be moulded directly by combining the same with a suitable amount of some other hardening agent—such for example as hexamethylenetetramine—and then subjecting the whole to heat and pressure. Prior to rendering infusible and insoluble, the material may be admixed with any suitable filling or coloring agents. The material—more particularly that from Example V—may also be utilized in solution in a suitable solvent for impregnation or coating purposes in the usual manner. As used in solution, it may be used either alone or admixed with a hardening agent, depending on the purposes for which it is to be utilized. Furthermore, the free acid used in the manufacturing process may be removed by any suitable means, such as washing, neutralizing or a combination of both, before the resin is utilized.

It is to be understood that the invention generally, and the examples particularly, are not confined to all the precise proportions or to the details herein set forth by way of illustration; that modifications and variations may be made as conditions may require or may be deemed desirable. For instance, in the examples given, only ordinary acetylene ($C_2H_2$) is mentioned; in place of acetylene, however, there may be utilized a di-acetylene, poly-acetylene or substituted acetylenes, in fact any body containing the triple bond characteristic of acetylene compounds; in place of phenol or of cresylic acid a phenolic body such as naphthol may be utilized. Furthermore, instead of mercurous sulphate, any compound of mercury may be used, such as mercurous oxide, mercuric oxide or mercuric sulphate.

In order that there may be no doubt or misunderstanding as to the term "synthetic resin" as used in the following claims, it may be stated that this term has been used in a broad sense as embracing condensation products which are fusible and soluble and intended for further treatment, and is not limited to condensation products which are infusible and insoluble and to which the term "resin" may, in the estimation of some persons, be limited.

In the following claims, the term "sulphuric acid" is to be understood as including sulphuric anhydride and the acid salts of sulphuric acid.

Having thus described our invention, what we claim is:—

1. A composition of matter comprising a condensation product of acetylene and a phenolic body treated above 100° C. with acetylene and substantially free from uncombined phenolic body.

2. A composition of matter comprising a condensation product of acetylene and a phenolic body substantially free from uncombined phenolic body.

3. A composition of matter comprising a condensation product of acetylene and phenol substantially free from uncombined phenol.

4. A composition of matter comprising a condensation product of acetylene and phenol combined with an aldehydic hardening agent and containing substantially no free phenol.

5. A composition of matter comprising a condensation product of acetylene and phenol combined with hexamethylene tetramine and containing substantially no free phenol.

6. A composition of matter comprising a condensation product of acetylene and a phenolic body combined with an aldehydic hardening agent and containing substantially no free phenolic body.

7. A composition of matter comprising a condensation product of acetylene and a phenolic body combined with hexamethylene tetramine and containing substantially no free phenolic body.

In witness whereof, we have hereunto set our hands.

HOWARD W. MATHESON.
JULIUS A. NIEUWLAND.